UNITED STATES PATENT OFFICE.

HENRY WILLIAM DE STUCKLÉ, OF DIEUZE, GERMANY.

ZINC-SULFID PIGMENT AND PROCESS OF PRODUCING THE SAME.

No. 884,874.  Specification of Letters Patent.  Patented April 14, 1908.

Application filed February 1, 1908. Serial No. 413,764.

*To all whom it may concern:*

Be it known that I, HENRY WILLIAM DE STUCKLÉ, a citizen of the German Empire, residing at Dieuze, Alsace-Lorraine, Germany, engineer, have invented certain new and useful Improvements in Zinc-Sulfid Pigments and Processes of Producing the Same, whereof the following is a specification.

This invention relates to zinc sulfid pigments and processes of producing the same; and comprises a precipitated partially dehydrated zinc sulfid resistant to weather and light and a process of making the same which comprises the formation of a hydrated zinc sulfid and the dehydration of this sulfid by regulated heating until a resistant hydrated sulfid is produced; all as more fully hereinafter described and as claimed.

Hydrated sulfid of zinc obtained in the wet way by precipitation of aqueous solutions of zinc compounds by sulfids is a white pigment of great covering power; a property which it retains even in admixture with other pigments of less covering power. Pigments so made and consisting in whole or in part of precipitated zinc sulfid would form an excellent and harmless substitute for white lead were it not for the fact that such sulfid discolors more or less, assuming yellow, brown, gray or black hues upon exposure to light, and the fact that the sulfid being in a reactive form is easily oxidized upon exposure to rain and weather to form sulfate of zinc.

Experiments have shown me that the hydrated sulfid of zinc with decreasing proportions of water of hydration shows a decreasing sensitiveness to light and an increasing resistance to atmospheric conditions. Various hydrates of zinc sulfid of varying properties may be obtained by drying at different temperatures for the proper length of time. The sensitiveness to light and weather reaches its minimum with complete expulsion of water. But with this expulsion of water there is found also a small reduction of the covering capacity and with complete expulsion the white of the pigment assumes a yellow tinge the depth of the yellow tint increasing with continued heating. For these reasons the best results are obtained with a considerable but incomplete expulsion of water, as, for instance, in dehydrating to such an extent that the resultant hydrate contains at least five molecules of zinc sulfid for every molecule of water.

In the subjoined table are synopsized the results of a series of experiments in which the dried paints were continuously exposed during a period of 21 days to the action of a source of light very active in actinic rays:

| Hydrate. | Per cent water. | Exposure. | Color assumed. |
|---|---|---|---|
| $7ZnS.2H_2O$ | 4.9 | 2 days | Weak yellow tinge. |
| $7ZnS.2H_2O$ | 4.9 | 6 days | Strong yellow gray. |
| $9ZnS.2H_2O$ | 3.9 | 2 days | Weak yellow. |
| $9ZnS.2H_2O$ | 3.9 | 9 days | Strong yellow gray. |
| $5ZnS.1H_2O$ | 3.5 | 6 days | Weak yellow. |
| $5ZnS.1H_2O$ | 3.5 | 18 days | Distinct yellow. |
| $6ZnS.1H_2O$ | 2.9 | 18 days | Scarcely perceptible. |
| $7ZnS.1H_2O$ | 2.6 | 21 days | Completely white. |
| Commercial lithopone | | 18 hours | Dark gray. |

As already stated, with the reduction of the hydration there occurs a small decrease of covering power. For instance, the hydrate $7ZnS.1H_2O$ has a covering power about 10 per cent. less than that of the hydrate $7ZnS.2H_2O$. For some purposes it will, therefore be preferable to carry the dehydration only to the stage of $5ZnS.1H_2O$; a hydrate which has considerable resistance to light and weather. The hydrates which correspond to a ratio of 6 or 7 or more molecules of ZnS to 1 molecule of $H_2O$ may be considered light-proof and have a very good resistance to the oxidizing influence of the air and the solvent influence of water.

The partial dehydration desired may be effected by drying at comparatively high temperatures, using increased or reduced pressures, and water-absorbing means if desired. For instance the precipitated hydrated zinc sulfid may be treated in an iron vessel provided with stirring means and externally heated by fire gases, at a temperature of about 300° C. until a sample exhibits the desired degree of dehydration when the heating is stopped and the material allowed to cool.

The described process may be applied to zinc sulfid existing in admixture with other pigments as in the composite pigments obtained by the co-precipitation of zinc sulfid with other pigment bodies. Experiments however show a different behavior of such mixed precipitates when obtained from neutral zinc salts, such as the sulfate or the chlorid and when obtained from alkaline solutions of zinc. In the co-precipitated pigments of the first class, such as the commercial lithopones, the process is not very successful, but mixed pigments obtained from alkaline solutions of zinc behave like sulfid of zinc, being sensitive to light and weather and being rendered resistant by partial dehydration.

The following purely illustrative instances of the practice of the described process may be adduced:—Zinc is dissolved in an alkali solution, as, for instance, in soda lye, forming a "zincate" and this liquid is mixed with a solution of a sulfid, as with sodium sulfid. Zinc sulfid and caustic alkali are formed in accordance with a well known reaction and the former precipitates in a hydrated state. The precipitate is filtered off, or otherwise isolated, washed and dried at 90° C. This gives a product having the composition $5ZnS.2H_2O$. The product is next heated, as by external heat from fire gases, to a temperature around 300° C. until a product of the composition $6ZnS.1H_2O$ is formed, when the heating is discontinued.

The zinc sulfid prepared as just described and dried to a composition of $5ZnS.2H_2O$ may be mixed with "permanent white" or sulfate of barium in a dry state. The mixture is then heated until the contained zinc sulfid passes into the hydrate $6ZnS.1H_2O$.

For a mixed pigment containing co-precipitated pigmentary bodies an alkaline solution of zinc may be mixed with a solution of an alkali sulfate, as sodium sulfate, and a warm solution of barium sulfid added with constant stirring. The precipitate obtained will contain barium sulfate and hydrated zinc sulfid. The precipitate is filtered off, washed and dried at 90° C. till the contained zinc sulfid has the composition of $5ZnS.2H_2O$ and then subsequently heated till the zinc sulfid passes over into the form $6ZnS.1H_2O$.

What I claim is:—

1. A light-proof and weather-proof pigment comprising a hydrated zinc sulfid wherein the molecular ratio of ZnS to $H_2O$ is not less than 5 to 1.

2. The process of preparing pigments which comprises the formation of a precipitated hydrated sulfid of zinc and its partial dehydration to form a hydrate wherein the ratio of ZnS to $H_2O$ is not less than 5 to 1.

3. The process of preparing pigments which comprises the formation of a precipitate comprising a hydrated sulfid of zinc and dehydrating said precipitate until the said sulfid forms a hydrate wherein the ratio of ZnS to $H_2O$ is not less than 5 to 1.

4. The process of preparing pigments which comprises the formation of a precipitate comprising a hydrated sulfid of zinc, heating said precipitate at a temperature of about 300° C. until said sulfid forms a hydrate wherein the ratio of ZnS to $H_2O$ is not less than 5 to 1 and discontinuing the heating.

5. The process of preparing pigments which comprises the formation of a precipitate comprising a hydrated sulfid of zinc from an alkaline solution containing zinc and dehydrating said precipitate until said sulfid of zinc forms a hydrate wherein the ratio of ZnS to $H_2O$ is not less than 5 to 1.

In testimony whereof I have signed this specification in the presence of two subscribing witnesses.

HENRY WILLIAM DE STUCKLÉ.

Witnesses:
M. DE STUCKLÉ,
M. THÉOBALD.